H. T. YOUNG.
SWEEP STOCK PLOW.
APPLICATION FILED MAY 22, 1913.

1,088,508.

Patented Feb. 24, 1914.

WITNESSES
J. E. Wade
C. E. Traynor

INVENTOR
Henry T. Young
BY Munn & Co.
ATTORNEYS

UNITED STATES PATENT OFFICE.

HENRY T. YOUNG, OF FLORENCE, SOUTH CAROLINA.

SWEEP-STOCK PLOW.

1,088,508.
Specification of Letters Patent.
Patented Feb. 24, 1914.

Application filed May 22, 1913. Serial No. 769,175.

*To all whom it may concern:*

Be it known that I, HENRY T. YOUNG, a citizen of the United States, and a resident of Florence, in the county of Florence and State of South Carolina, have invented a new and useful Improvement in Sweep-Stock Plows, of which the following is a specification.

My invention is an improvement in sweep stock plows of the character used for siding young corn and for the cultivation of cotton throughout its growth, wherein mechanism is provided for permitting the plow to be adjusted toward and from the beam without dismantling the plow or removing the plow from the supporting hanger, and wherein the plow may be held in adjusted position firmly and without any attention from the operator, wherein the stock is supported from the beam in such manner that it may swing with the plow, and wherein the stock is connected to the plow to swing in unison therewith and to hold the same relative position with respect to the plow regardless of the position of the plow.

Figure 3:
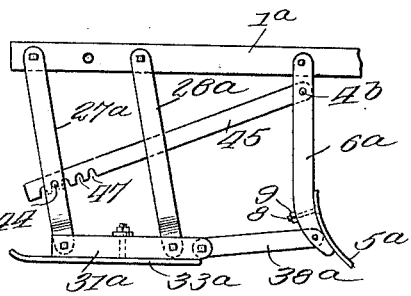
Figure 1:
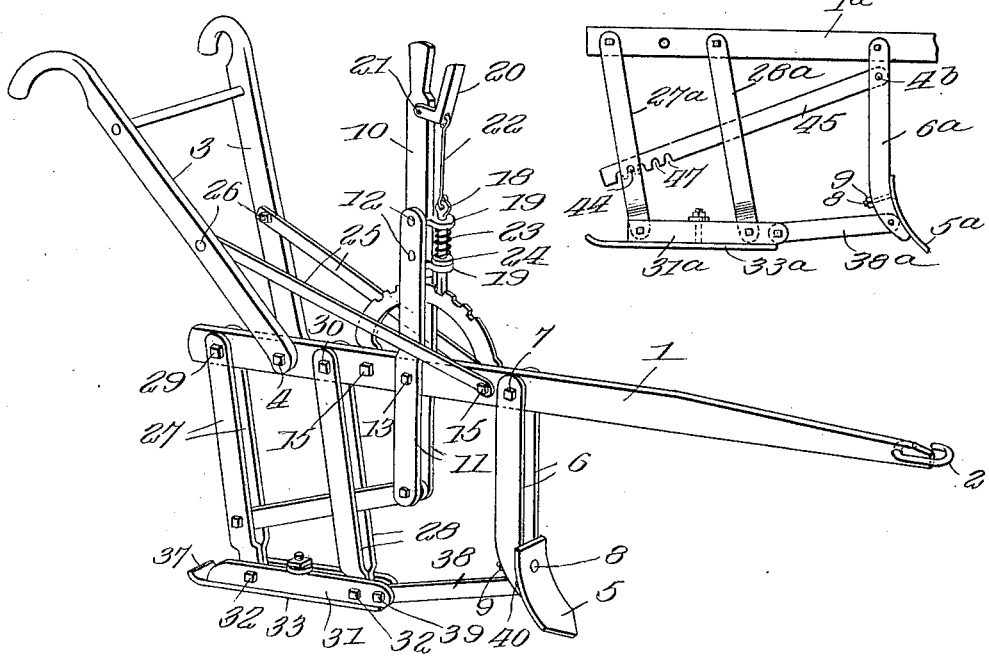
Figure 2:
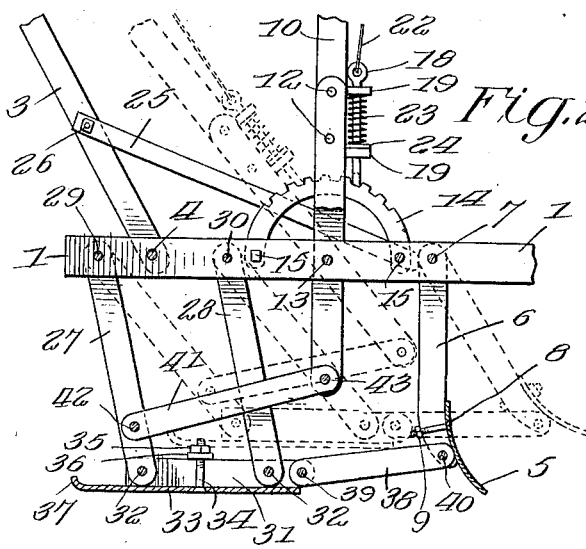

In the drawings:—Figure 1 is a perspective view of one embodiment of the invention, Fig. 2 is a partial side view of Fig. 1, and Fig. 3 is a similar view of another embodiment of the invention.

In the present embodiment of the invention the beam 1 is provided at its front end with the usual ring 2, for engagement by draft apparatus, and a pair of handles 3 is connected to the beam near its rear end by means of a bolt 4, the said bolt passing through the handles, which are arranged on opposite sides of the beam.

The plow blade or shovel 5 is supported by a pair of standards 6, the said standards comprising a pair of parallel spaced arms, arranged on opposite sides of the beam at approximately the center thereof, and being pivoted thereto by means of a bolt 7. The plow is connected to the standards by means of a bolt 8, the said bolt passing rearwardly between the arms and being engaged by a nut 9 in rear of the said arms.

A lever is pivoted to the beam between the connection of the handles and the connection of the standards 6, the said lever comprising a handle portion 10, and a split portion composed of oppositely arranged sections 11, the lower end of the handle being arranged between the upper ends of the said sections and secured thereto by means of rivets 12, or the like. The sections 11 are arranged on opposite sides of the beam, and are pivoted thereto by means of a bolt 13, the said bolt passing through the sections and the beam. A toothed sector 14 is secured at its ends to the beam on one side thereof by means of bolts 15, and the lever is provided with a latch 18, slidable in bearings 19, on the lever and coöperating with the teeth of the sector to hold the lever in adjusted position.

The latch is operated by means of a latch lever 20, pivoted to the lever at 21, and connected to the latch by a link 22. A coil spring 23 encircles the latch between a stop 24 thereon and the uppermost bearing 19, and acts normally to press the latch into engagement with the teeth of the sector.

Braces 25 are connected with the respective handles at one end by means of bolts 26, and at the other end the said braces are connected to the beam by means of the forward bolt 15, before mentioned. The braces 25 are on opposite sides of the beam and the lever and the sector, and the said braces prevent rearward movement of the upper ends of the handles.

A plurality of pairs of hanger bars 27 and 28, respectively, are pivoted to the beam, the bars 27 being arranged on opposite sides of the beam at the rear thereof and pivoted to the beam by a bolt 29. The members of the pair 28 are also arranged on opposite sides of the beam in front of the connection of the handles, and are pivoted to the beam by means of a bolt 30. The members of each pair of bars are offset inwardly at their lower ends, and are received between a pair of spaced parallel bars 31, and each pair of bars 27 and 28 is pivoted to the bars 31, by means of bolts 32. A plate 33 is arranged at the under edges of the bars 31, the said plate extending transversely of the said bars 31, and the plate is secured to the bars by means of a bolt 34. The bolt 34 passes upwardly through the plate, and between the bars 31 and is engaged by a nut 35, above the said bars 31. A washer 36 is arranged below the nut, the washer being of a diameter to engage the upper edges of both bars 31. The head of the bolt is countersunk in the plate 33, and the rear end of the plate is curved upwardly as shown at 37.

A link 38 has one of its ends provided with an opening for receiving a bolt 39, which connects the front end of the bars 31, and the opposite end of the link is received between the arms 36 at the rear of the blade 5, and is pivoted to the said arms by means of a bolt 40.

It will be evident that when the latch 18 is released from the teeth of the sector, the lever may be swung as indicated in dotted lines in Fig. 2. The lower end of the said lever is connected to the pair of hanger bars 27, by means of a link 41. The rear end of the link is received between the bars 27, and is pivoted thereto by means of a bolt 42, while the front end is received between the lower ends of the section 11, and is pivoted thereto by a bolt 43. When the upper end of the lever is swung toward the handles 3, the hanger bars 27 and 28 will be swung forwardly at their lower ends, and on account of the link 38, the supporting arms 6 for the plow will also be swung forwardly. The plate 33 will always occupy the same relative position with respect to the plow, whatever the position of the plow. As the plow swings forwardly from the position of Fig. 2, it will move upwardly as will also the plate 33, since the said plate must move with the plow. The head of the bolt 8 is flush with the surface of the plow, the plow being countersunk to receive the head.

In the embodiment of the invention shown in Fig. 3, the plow 5ª is supported by the hangers 6ª from the beam 1ª, in the same manner as described for the construction of Fig. 1. The plate 33ª is connected to the stock 31ª in the same manner and the stock is connected to the plow hanger by the link 38ª, the stock being supported by the hangers 27ª and 28ª, and the construction is precisely the same as in the construction of Fig. 1. A bolt 44 is passed transversely of the hangers 27ª just above the stock, and a lever 45 is pivoted at 46 between the hangers 6ª, near the beam. The rear end of the lever is notched or provided with teeth on the under edge as indicated at 46ª, and the said teeth are adapted for engagement by the bolt 44. The lever 45 is arranged between the pairs of hangers 6ª, 27ª and 28ª. With this construction the plow is adjusted by releasing the teeth of the lever 45 from the bolt, swinging the parts into adjusted position, and afterward engaging the teeth with the bolt to hold the parts in such position.

The improved plow is used more especially for cultivating young corn and for cultivating cotton throughout its growth. The point of the plow 5 extends below the bottom of the stock 31 or 31ª, as the case may be, and is flush with the under surface of the plate 33. Whatever the position into which the plow is adjusted, the relative position of the plow and the plate will not be changed.

The runner consisting of the plate 33 and the bars 31 holds the plow in proper engagement with the ground, during the act of plowing, and by means of the connections between the plow and the beam and between the runner and the beam, the said plow and runner may be adjusted toward and from the beam simultaneously without varying their relative position with respect to each other.

The ring 2 is passed through an opening in the end of the beam, and the ends are then bent approximately parallel with the body, but in spaced relation so that the draft apparatus may be engaged with the outer end.

I claim:—

1. In a plow, the combination with the beam, of hangers pivoted thereto and spaced apart longitudinally from each other, said hangers being three in number, a plow in connection with the front hanger, a runner supported by the rear and intermediate hangers, a connection between the runner and the plow, a link pivoted to one of the hangers for swinging the hangers, and means for engagement by the link to hold the parts in adjusted position, each hanger comprising a pair of laterally spaced approximately parallel arms, the runner consisting of a plate arranged below the lower ends of the hangers, a pair of bars arranged above the plate on the upper surface thereof and pivoted to the hangers, said plate being connected to the bars.

2. In a plow, the combination with the beam, of hangers pivoted thereto and spaced apart longitudinally from each other, said hangers being three in number, a plow in connection with the front hanger, a runner supported by the rear and intermediate hangers, a connection between the runner and the plow, a link pivoted to one of the hangers for swinging the hangers, and means for engagement by the link to hold the parts in adjusted position.

HENRY T. YOUNG.

Witnesses:
C. E. TRAINOR,
SOLON C. KEMON.

Copies of this patent may be obtained for five cents each, by addressing the "Commissioner of Patents, Washington, D. C."